Dec. 10, 1968 C. W. NEWELL 3,415,458

TAPE REEL CONSTRUCTION

Filed Jan. 25, 1967

INVENTOR.

Chester W. Newell

BY Flehr, Hohbach, Test, Albritton & Herbert

Attorneys

United States Patent Office 3,415,458
Patented Dec. 10, 1968

3,415,458
TAPE REEL CONSTRUCTION

Chester W. Newell, San Jose, Calif., assignor to Newell Associates, Inc., Sunnyvale, Calif., a corporation of California Filed Jan. 25, 1967, Ser. No. 611,710
3 Claims. (Cl. 242—71.8)

ABSTRACT OF THE DISCLOSURE

A length of tape is formed in a roll upon a cylindrical hub. The tape width is essentially coextensive with the roll supporting surface of the hub. The ends of the roll supporting surface form a shoulder for cooperating with the rotating flanges of a drive capstan or other flanged arcuate guide members. The plane in which the shoulders lie is circumferentially unobstructed to provide access thereto by the flanged arcuate rotating member.

Readily detachable flanges are carried by resilient tangs engaging the reel hub. These flanges are axially spaced from the ends of the roll supporting hub surface.

*Background of the invention*

This invention relates to a tape reel construction for rotatably supporting a length of pliable recording tape wrapped to form a roll thereof. The reel construction is particularly useful in feeding the tape from a supply to a take-up roll where one or the other or both of the rolls are arranged in "rim-driven" relation to a drive capstan where the capstan includes a pair of flanges bounding the driving surface of the capstan. Thus, the edge of the roll (as distinguished from the tape edges) is driven by the tread of the capstan.

*Objects*

In general, it is an object of this invention to provide an improved rotatable tape reel construction.

A further object of the invention is to provide a tape reel construction of a type whereby protective flanges for the reel may be provided only when the reels are actually in use on tape feeding apparatus, but can otherwise be omitted, even when the roll is to be packaged for shipment.

An additional object of the invention is to provide a rotatable tape reel construction characterized by a central tape supporting drum portion bounded by registration end edges adapted to cooperate with flanges carried by a drive capstan, and further where the tape edges and the registration end edges of the drum will lie in a common plane during shipment.

Further objects and features of the invention will appear from the following description in which the preferred embodiments of the invention have been set forth in detail in conjunction with the accompanying drawing.

*Summary of the invention*

Figure 1:
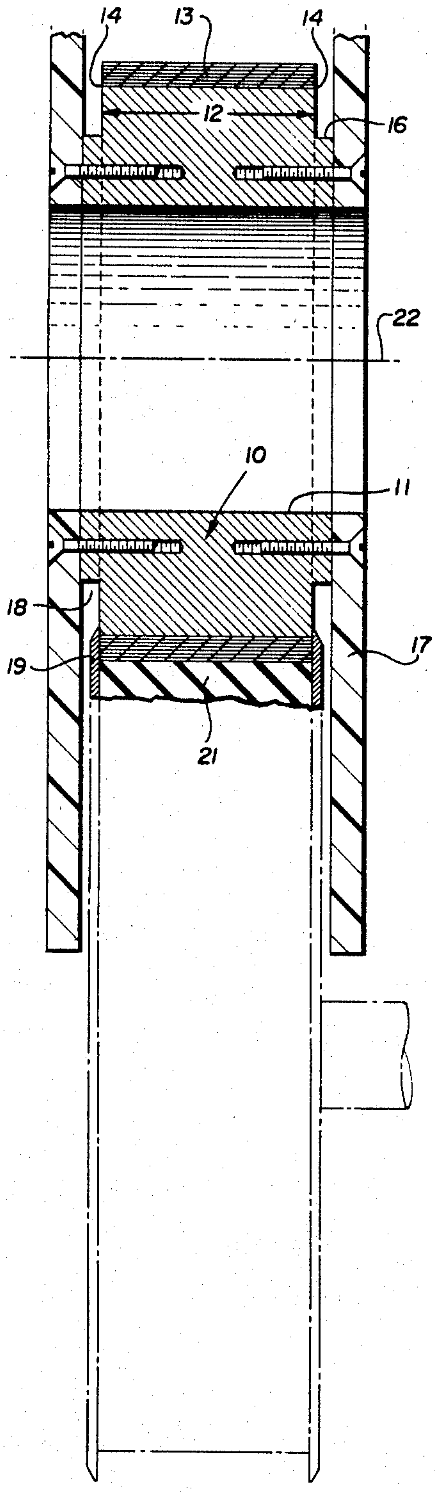
FIGURE 1 is a centerline section view of a tape reel according to the invention shown in cooperation with a drive capstan carrying flanges.

In general, there is provided a tape reel construction characterized by a hub formed to include a cylindrical portion having an axial extent adapted to support the width of a length of pliable recording tape wrapped about same so as to form a roll of tape. Spacer portions disposed about the axis of rotation of the hub lie axially outwardly of the tape supporting portion at each end of the latter. The periphery of the spacer portions terminates radially inwardly of the tape-supporting portion whereby the end edges of the tape supporting portion provide a registration shoulder or corner adapted to be engaged by the rotating flanges of a drive capstan cooperating with the tape roll. The hub construction is adapted to carry and support a pair of protective flanges readily detachably engaged thereto and spaced axially from the end edges of the tape supporting cylindrical portion of the hub.

Referring to the drawing, the hub construction includes a generally right cylindrical body 10 formed with a central opening 11 adapted to be received over a drive spindle of suitable tape transport apparatus. As is known, so-called "hold-down knobs" cooperate with the supporting spindles to engage the opposite ends of a reel between the knob and the supporting turntable.

*Description of the preferred embodiments*

Body 10 is formed with a right cylindrical tape supporting drum portion 12 dimensioned and adapted to provide an annular periphery of axial extent substantially coextensive with the width of a tape 13 wrapped thereon. Drum portion 12 is bounded at its ends by the corners or end edges 14 which serve to define the tape supporting extent of drum 12.

It has been found preferable to dimension the axial extent of drum portion 12 whereby it is equal to or slightly narrower than the narrowest portion of tape 13 which it supports. Thus, drum portion 12 should be of an axial extent essentially no wider than the minimum width of tape wrapped around it. In one particular instance, for example, where tape 13 was of a width of 0.250 inch manufactured to tolerances of (+) 0 inch and (−) 0.003 inch, the narrowest width of tape was found to be 0.247 inch. Accordingly, the axial extent of drum portion 12 preferably, in the foregoing instance, was manufactured to run on the order of 0.244 to 0.247 inch, and tolerances on the order of the foregoing are to be understood as being accommodated by the term "substantially coextensive" as used herein.

Each end of body 10 is formed to include cylindrical spacer portions 16 which extend axially outwardly of drum portion 12 and are adapted to space end edges 14 from flanges 17 carried at each end of body 10. Flanges 17 extend radially of drum portion 12 so as to overlie tape 13 in protective relation thereto. Each flange 17 is spaced axially from one of edges 14 so as to form an encircling gap 18 between flange 17 and end edge 14 of the tape supporting periphery defined by drum portion 12. Gaps 18 extend continuously around body 10 and are adapted to receive flanges 19 of a drive capstan 21 disposed to enter between flanges 17 and into edge driving relation with the roll of tape.

Accordingly, end edges 14 form a circumferentially unobstructed registration shoulder which lies in a plane unobstructed radially outwardly of the circumference of portion 16. The radial spacing between portions 16 and the periphery of body 10 is sufficient to accommodate full entry of flanges 19.

It is to be understood that in a typical tape transport embodiment the axis of rotation 22 of the tape reel is disposed for movement relatively toward the axis of rotation of drive capstan 21. Thus, as tape is unwrapped from drum portion 12 the tape roll will advance toward the drive capstan until it has been entirely fed from portion 12. During this movement, flanges 19, which are preferably spring-loaded toward one another, resiliently engage the edges of tape 13 and proceed ultimately into gaps 18. The radially inward extent of gaps 18 is dimensioned and adapted to be sufficient to accommodate entry of flanges 19 without flanges 19 bottoming upon spacer portion 16. In this manner, capstan 21 can remain in edge driving relation with tape 13 throughout a complete transfer thereof.

Figure 2:
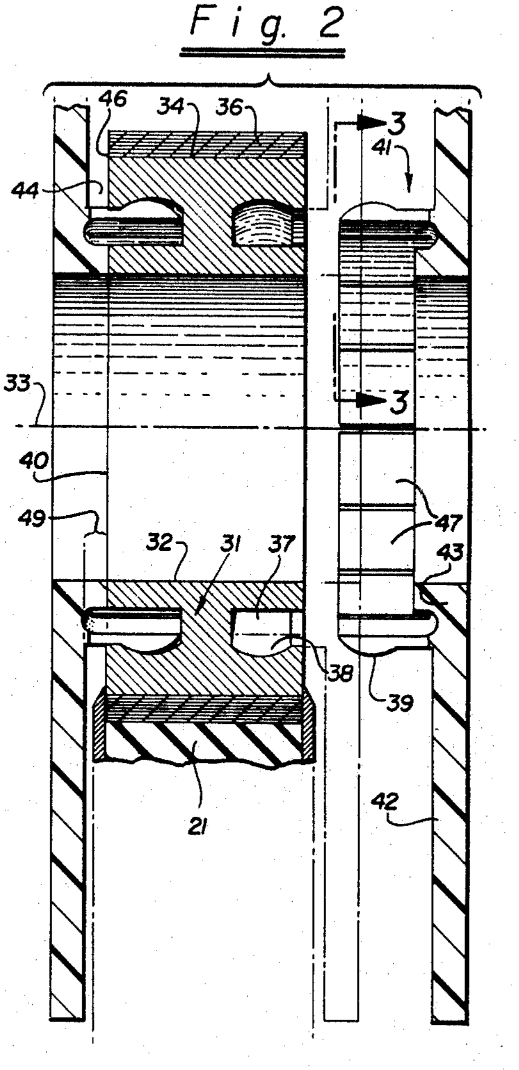
FIGURE 2 is a centerline section view of another embodiment of a tape reel according to the invention showing readily releasable flanges cooperating with the hub construction.
Figure 3:
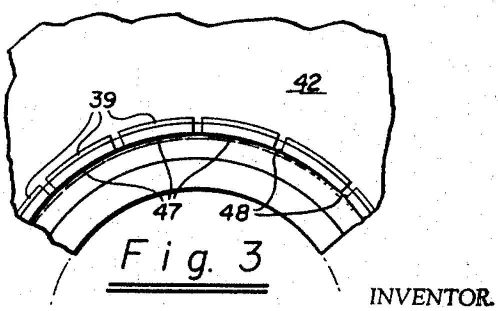
FIGURE 3 is a view of a portion of the embodiment of FIGURE 2 taken along the line 3—3 thereof.

While flanges 17 are shown as attached as by means of screws to the ends of body 10, a particularly preferred construction is characterized by readily detachable flanges as shown by reference to FIGURE 2.

In the embodiment shown in FIGURE 2 a tape reel is shown comprising the annular body 31 formed with a central mounting opening 32 adapted to receive a support spindle defining the axis of rotation 33.

Body 31 includes a right cylindrical tape supporting periphery 34 dimensioned to be substantially coextensive with the width of a tape 36 wrapped therearound.

Each end of body 31 includes an annular axially extending recess in the form of a groove 37. One wall of groove 37 includes a relieved detent portion 38 extending continuously therearound. The other wall extends axially to form a support base or portion 40 lying in the plane of the tape edges whereby a support surface, when the reel is laid horizontally, will contact tape edges and the end of the body 31 and thereby preclude lateral shifting of tape convolutions as in shipment.

Preferred means for readily releasably engaging detent portion 38 for supporting radially extending flanges in axially spaced relation to each end of periphery 34 comprises means now to be described.

A protective flange member 41 is preferably comprised of a molded one piece construction and includes a radially extending protective skirt portion 42 to be carried in spaced relation to the edges of tape roll 36. Member 41 further includes a central hub portion 43 axially dimensioned to provide an encircling gap 44 therearound between the end corners or edges 46 of tape supporting periphery 34. Hub portion 43 receives portion 40.

In general, flange members 41 are readily detachably held to the ends of body 31 by means of radially yielding protuberances (such as the tangs 47) extending axially of body 31 at each end thereof. Each protuberance (preferably the tangs 47) includes means for cooperatively engaging a recess formed in the end of body 31, whereby the arcuate outer surfaces of the protuberances or tangs 47 are formed to cooperate with portion 38 to draw flange member 41 snugly against portion 40.

More particularly, the axially extending protuberances include a number of cylindrically arranged projecting tangs 47 each of which includes a radial dimension sufficiently thin to permit resilient radial yielding thereof. Each tang 47 is formed to include a portion of an encircling rib 39. Radial gaps 48, defined between each adjacent pair of tangs 47, serve to accommodate radially inward tang movement during insertion of tangs 47 into groove 37.

To assemble flange member 41 upon an end of body 31, it is only necessary to align flange member 41 centrally of body 31 and press flange member 41 axially. Tangs 47, as they enter groove 37, bend individually inwardly until rib 39 aligns substantially radially with detent portion 38 of groove 37. At that point, tangs 47 are free to snap resiliently outwardly to frictionally engage body 31. The curvature of rib 39 relative to the curvature of detent portion 38 serves to draw flange member 41 axially slightly into a snug engagement with portion 40.

The annular encircling gap 44 is defined and maintained by the spacing function of the cylindrical spacer portion 49 carried by flange member 41. Accordingly, the tape reel construction shown in FIGURE 2 is arranged to cooperate with a tape drive capstan 21 as previously described with respect to the embodiment of FIGURE 1.

From the foregoing, it will be readily apparent that there has been provided an improved tape reel construction of a type wherein the cost of manufacture of the reel may be reduced by sharing the use of readily detachable flanges with any one of a number of tape supporting hubs. Thus, in the sale of tape reels, the flanges may be omitted and only the hub portion supplied whereby each customer may supply his own flanges to be applied when the roll of tape is placed in use.

It will also be apparent that rolls of tape stored on hubs can be packaged without flanges using the construction shown. The edges of the tape and an end of body 31 all lie upon the supporting surface of the boxes or containers in which the rolls of tape are packaged. Thus, maximum efficiency of space is utilized while eliminating any need for the commonly used specially formed boxes for packing tape rolls. On the other hand, such a rolle of tape is completely compatible with apparatus for handling the tape as may require the use of flanged reels. Finally, it will be readily apparent that the storage efficiency and economy of space effected by the disclosed tape roll is greatly enhanced by permitting the removal of flanges from each reel of tape.

While the reel herein disclosed has been described as primarily adapted to cooperate with an arcuate tape guide member in the form of a flanged drive capstan, it is to be understood that the reel construction cooperates similarly with other flanged arcuate tape guide members, such as reel followers of a type employed in spooling of tape, when the flanges of the follower approach the region of the reel hub.

What is claimed is:

1. A reel for rotatably supporting a length of pliable recording tape wrapped to form a roll thereof, said reel comprising annular body means defining a cylindrical drum formed to include end edges bounding an annular periphery of axial extent adapted to be substantially coextensive with the width of the tape to be wrapped thereon, flanges supported by said body means and extending radially thereof to overlie tape forming a roll wrapped about said drum, means spacing each of said flanges axially from an associated one of said end edges to define therebetween an encircling gap between the flange and the end edge of said periphery, said gaps extending continuously unobstructed around said body means, and lying in a plane unobstructed radially outwardly thereof whereby to receive therein flanged arcuate tape guiding members disposed in edge contacting relation to said roll.

2. A reel construction according to claim 1 wherein said flanges include means for releasably engaging said drum to detachably carry said flanges thereon.

3. A reel construction according to claim 1 wherein said flanges carry yielding protuberances extending axially of the drum and, at the ends of said drum, cylindrical spacer portions extending axially of the drum, a recess adapted to yieldingly receive said protuberances to engage same and support said flanges.

References Cited

UNITED STATES PATENTS

| | | | |
|---|---|---|---|
| 3,191,881 | 6/1965 | Campbell et al. | 242—71.8 |
| 3,298,625 | 1/1967 | Babcock | 242—71.8 |

FOREIGN PATENTS

| | | | |
|---|---|---|---|
| 731,018 | 6/1955 | Great Britain. | |

FRANK J. COHEN, *Primary Examiner.*

NATHAN L. MINTZ, *Assistant Examiner.*